I. HOUGHTLING.
CORN-PLANTER.

No. 183,567.

Patented Oct. 24, 1876.

WITNESSES:
Chas. Nida
John Goethals

INVENTOR:
I. Houghtling
BY
[signature]
ATTORNEYS.

UNITED STATES PATENT OFFICE.

IRA HOUGHTLING, OF HOUGHTON, MICHIGAN.

IMPROVEMENT IN CORN-PLANTERS.

Specification forming part of Letters Patent No. 183,567, dated October 24, 1876; application filed February 14, 1876.

*To all whom it may concern:*

Figure 1:
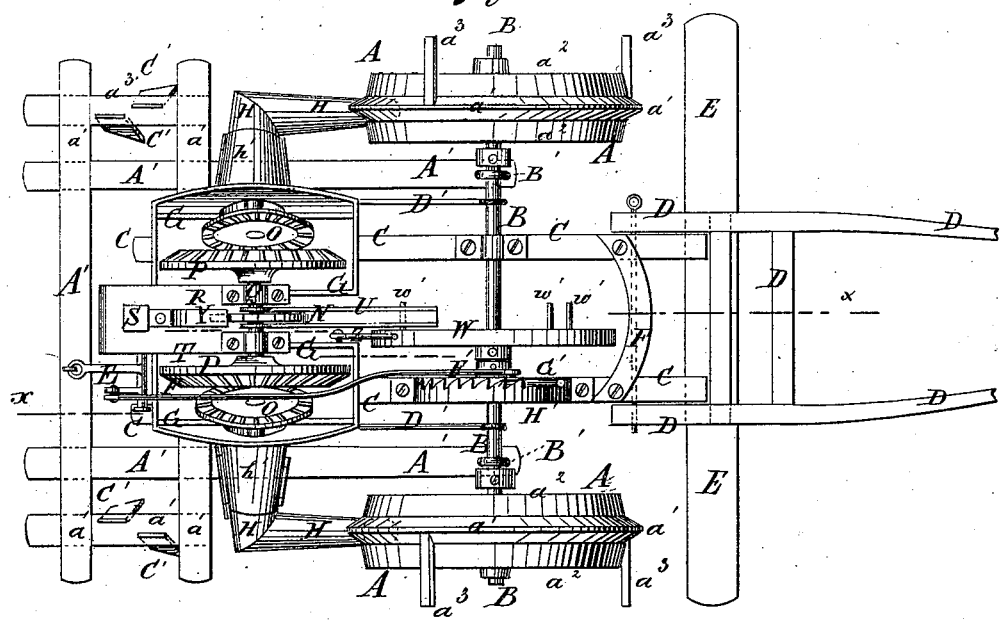
Figure 2:
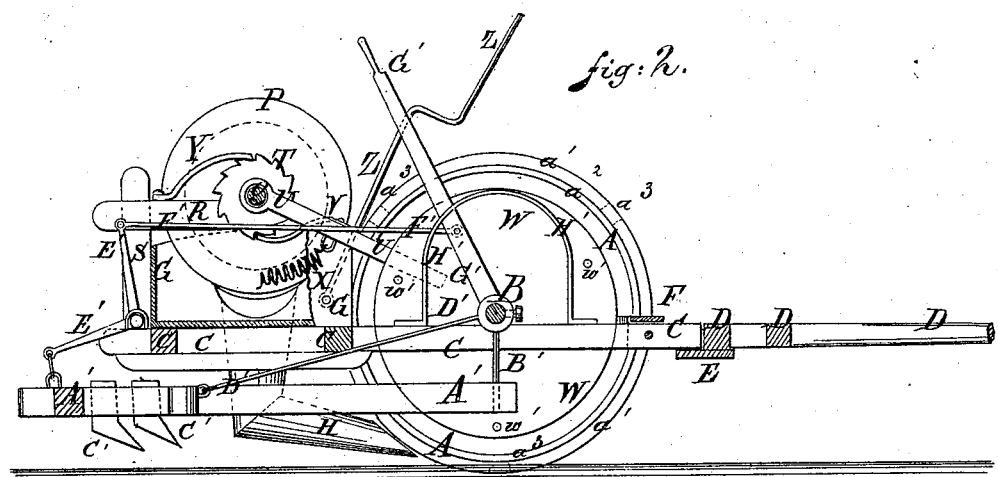
Figure 3:
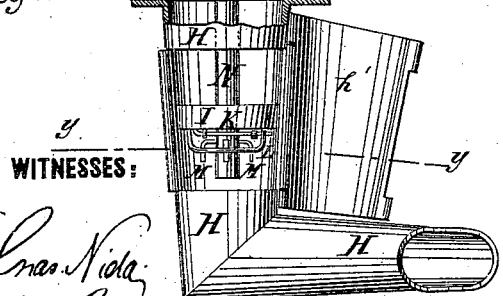
Figure 4:
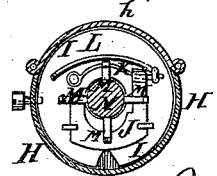

Be it known that I, IRA HOUGHTLING, of Houghton, in the county of Houghton and State of Michigan, have invented a new and useful Improvement in Corn-Planters, of which the following is a specification:

Figure 1 is a top view of my improved machine. Fig. 2 is a longitudinal section of the same, taken on the line $x\,x$ of Fig. 1. Fig. 3 is a detail view of the seed-dropping device. Fig. 4 is a detail cross-section of the same, taken through the line $y\,y$, Fig. 3.

Similar letters of reference indicate corresponding parts.

The invention consists in providing a corn-planter with a cam-shaft, disk-slide, spring, arm, and spouts; also, in connecting the feeding-tube slide and spring by a link that may be shortened, all as and for the purposes hereinafter more particularly described.

A are the wheels, the rims of which are made V-shaped to open a channel to receive the seed. Upon the sides of the rims of the wheels A are formed flanges $a^2$ to crush and pulverize the lumps and clods at the sides of the channels, so that the seed may be covered with fine soil. To the rims of the wheels A are attached outwardly-projecting arms $a^3$, in such positions as to come in contact with the ground at a distance apart equal to the required distance apart of the hills. The arms $a^3$ thus mark the cross-rows. The wheels A are rigidly attached to the axle B, so as to carry the said axle with them in their revolution. The axle B revolves in bearings attached to the side bars of the frame C. To the forward ends of the side bars of the frame C are pivoted the thills D, and to said ends are attached the platforms E and F for the driver to stand upon. To the rear end of the frame C are attached two seed-hoppers, G, which are placed side by side and at a little distance apart. To the outer sides of the seed-hoppers G are attached spouts H, by which the seed is conducted to the ground. The spouts H are made with a forward bend or elbow, so that the seed may be discharged close in the rear of the wheels A. The upper parts of the spouts H are made with a door, $h'$, to give access to the interior of said spouts when desired. In the upper part of each of the spouts H is secured a disk or cross-partition, I, in the lower part of which is formed a hole, through which the seed passes. The hole through the disk I is covered upon the lower side of said disk by a plate, J, sliding in keepers attached to said disk. The inner edge of the slide J is connected with spring K, near one end. The other end of the spring K is attached to the disk I, and its free end is connected with the free end of the arm L. The other end of the arm L is attached to the disk I. The arm L projects from the disk I, so that it may be struck by the projections or cams M attached to the shaft N, to draw back the slide J and allow the seed to drop out of the hole in the disk I. The shaft N passes through and revolves in a hole in the center of the disk I and its upper part revolves in a bearing attached to the side of the hopper G. To the upper ends of the shafts N are attached small bevel-gear wheels O, the teeth of which mesh into the teeth of two large bevel-gear wheels, P, attached to the opposite ends of a short shaft, Q. The shaft Q revolves in bearings attached to the forward part of a horizontal arm, R, the rear end of which is attached to a standard, S, attached to the middle part of the rear end of the frame C. To the middle part of the shaft Q is attached a ratchet-wheel, T.

U is a lever, the rear end of which is slotted to receive the ratchet-wheel T, and rides upon and is pivoted to the shaft Q. To the lever U is attached a spring-pawl, V, which engages with the teeth of the ratchet-wheel T. The outer end of the lever U projects along the side of a disk or wheel, W, attached to the middle part of the axle B, so as to be struck and raised by pins $w'$ attached to the side of said wheel W at such distances apart that the end of the lever U may slip off a pin, $w'$, each time seed is to be dropped. X is a spring, one end of which is attached to the lever U, and its other end is attached to the standard S, so as to draw the lever U down when released from the pins $w'$, and thus turn the ratchet-wheel T, gear-wheels P O, and shafts Q N, to withdraw the slide J and drop the seed. To the arm R is attached a spring-pawl, Y, to rest against the teeth of the ratchet-wheel T, and prevent it from being turned back by the friction of the pawl V when the lever U is being raised. Z is a lever, the lower end of which s pivoted to the frame C, and which has a shoulder formed upon it to receive one of the pins $w'$ of the wheel W, to prevent the seed-dropping device from being operated when turning the machine. A′ is a frame, the forward ends of the side bars of which are hinged to the lower ends of hangers B′, which are hung upon the axle B. The frame A′ is made with offsets or outward projections, to which the covering-plows C′ are attached, so that the said plows may be in the rear of the discharging ends of the spouts H, and may thus be in proper position for covering the seed. The draft-strain upon the frame A′ is sustained by the rods or chains D′, the forward ends of which are connected with and ride upon the axle B, and their rear ends are attached to the rear part of the said frame A′. To the rear part of the frame A′ is pivoted the end of a bent lever, E′, which is pivoted at its angle to the rear part of the frame C. The other arm of the lever E′ projects upward, and to its end is attached the rear end of a rod or chain, F′. The forward end of the chain or rod F′ is attached to a lever, G′, the lower end of which is pivoted to the axle B or frame C.

The lever G′ projects across the arched bar H′, the ends of which are attached to the frame C, and in the edge of which are formed teeth to take hold of the lever G′, and hold it in any position into which it may be adjusted. The lever G′ is held against the catch-bar H′ by a spring guide-bar. By this construction, by operating the lever G′, the cultivator-frame A′ may be raised from the ground when desired.

Having thus described my invention, I claim as new and desire to secure by Letters Patent—

1. The combination of the shaft N, provided with the projections or cams M, and the disk I, provided with the slide J, the spring K, and the arm L, with the conductor-spouts H, substantially as herein shown and described.

2. The combination of slide J and spring K, connected by an adjustable link, as and for the purpose specified.

IRA HOUGHTLING.

Witnesses:
BARTHOLOMEW SHEA,
THOMAS M. BRADY.